(12) United States Patent
Potier et al.

(10) Patent No.: US 12,384,526 B2
(45) Date of Patent: Aug. 12, 2025

(54) SPOILER ACTUATOR (71) Applicant: Goodrich Actuation Systems SAS, Vernon (FR)

(72) Inventors: Karl Potier, Paris (FR); Sebastien Vandevoir, Gennevilliers (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 56 days.

(21) Appl. No.: 18/348,420

(22) Filed: Jul. 7, 2023

(65) Prior Publication Data
US 2024/0034460 A1 Feb. 1, 2024

(30) Foreign Application Priority Data

Jul. 27, 2022 (EP) .................................... 22306118

(51) Int. Cl.
*B64C 13/50* (2006.01)
*B64C 5/10* (2006.01)
*F16H 25/20* (2006.01)
*F16H 25/24* (2006.01)

(52) U.S. Cl.
CPC ................ *B64C 13/50* (2013.01); *B64C 5/10* (2013.01); *F16H 25/20* (2013.01); *F16H 25/2454* (2013.01); *F16H 2025/2081* (2013.01)

(58) Field of Classification Search
CPC ............. F16H 25/2021; F16H 25/2015; F16H 25/2454; F16H 2025/2081; B64C 13/50; B64C 13/506; B64C 13/343; B64C 13/38; B64C 13/26; B64C 13/30; B64C 13/32; B64C 13/34
See application file for complete search history.

(56) References Cited

U.S. PATENT DOCUMENTS

| 6,116,103 A | * | 9/2000 | Heckel, Jr. ............. F16H 25/20 188/69 |
| 9,038,944 B2 | * | 5/2015 | Senegas .................. B64C 13/24 244/99.2 |
| 10,035,585 B2 | | 7/2018 | Schwartz |

(Continued)

FOREIGN PATENT DOCUMENTS

| EP | 3620334 A1 | 3/2020 |
| WO | 9842567 A1 | 10/1998 |

OTHER PUBLICATIONS

European Search Report for Application No. 22306118.5, mailed Jan. 20, 2023, 5 pages.

*Primary Examiner* — Gregory Robert Weber
(74) *Attorney, Agent, or Firm* — CANTOR COLBURN LLP (57) ABSTRACT

An electromechanical actuator comprises: a motor; a gearbox; an anti-extension device mounted between the motor and the gearbox. The motor and anti-extension device are mounted on a housing of the actuator. The actuator further comprises a screw shaft; a nut mounted on the screw shaft; an output rod connected to the nut, the output rod having a linear range of motion defined between full extension of the output rod at a first end point (A) and full retraction of the output rod at a second end point (C). The screw shaft, nut, and output rod are located in a cavity of the housing. The output rod and nut are held against rotation relative to the housing, such that rotation of the screw shaft drives the output rod to move linearly within the housing.

13 Claims, 9 Drawing Sheets

(56) References Cited

U.S. PATENT DOCUMENTS 10,907,712 B2* 2/2021 Bastide .............. F16H 25/2454
11,181,073 B2* 11/2021 Werquin ................ F02K 1/763
11,873,092 B2* 1/2024 Rozeboom ............. B64D 45/00

* cited by examiner

SPOILER ACTUATOR

CROSS REFERENCE TO RELATED APPLICATION

This application claims priority to European Patent Application No. 22306118.5 filed Jul. 27, 2022, the entire contents of which is incorporated herein by reference.

TECHNICAL FIELD

The present document relates to an electromechanical actuator with an anti-extension device.

BACKGROUND

Actuators are widely used in aircraft. In particular, electromechanical actuators (EMAs) are becoming more widely used for controlling the position of flaps, slats, a spoilers of aircraft. It is known to locate anti-extension device between a gearbox and a motor of the actuator, wherein when the anti-extension device is activated, the motor is protected against torque that is feeding-back through the system, e.g. resulting from loads on the flap, slat, or spoiler. Weight considerations are often paramount in designing aircraft components and so designing lighter weight components is generally desired for aerospace applications.

Figure 1:
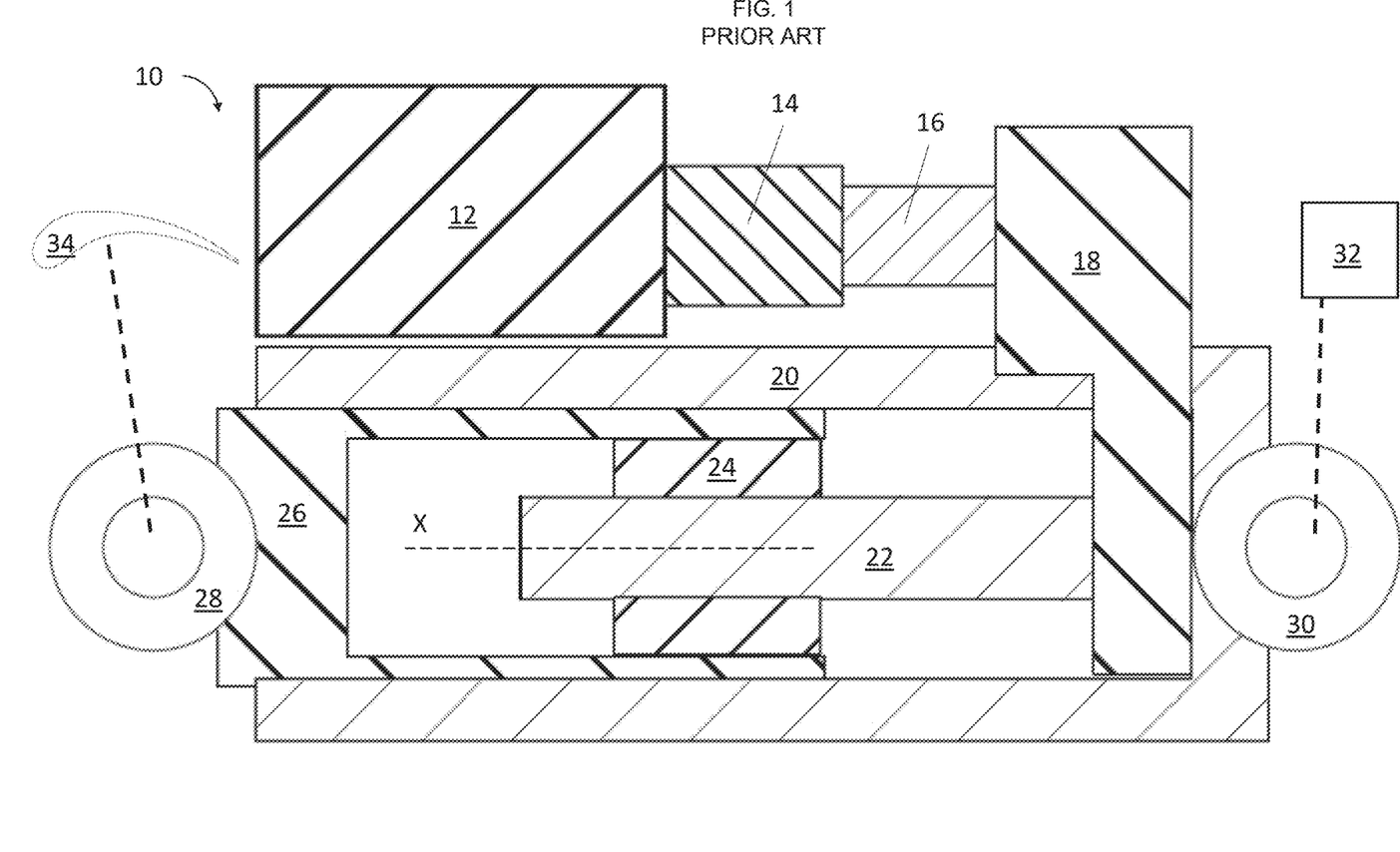
FIG. 1 shows a known design of EMA for a spoiler, the EMA having an anti-extension device.

FIG. 1 shows a known design of electromechanical actuator (EMA) 10. The EMA 10 comprises a motor 12 that is connected, in sequence, to an anti-extension device 14, a torque-limiter 16, and to a gearbox 18. These components 12,14,16,18 are mounted to an external surface of a housing 20. The gearbox 18 extends through the housing and drives a screw shaft 22 in rotation. The screw shaft 22 extends within the housing 20 along an axis X. A nut 24 is mounted on the screw shaft and an output rod 26 is connected to the radially-outer side of the nut 24. The output rod 26 is held against rotation relative to the housing 20, e.g. via splines (not shown), and this holds the nut 24 against rotation relative to the housing 20. The output rod 26 has a connection end 28 for connection to a spoiler 34. The housing 20 has a housing connection end 30 whereby the housing 20 (and EMA 10 as a whole) may be connected to an airframe 32.

In normal operation, the motor 12 rotates an output shaft (not shown) that turns the gears of the gearbox 18 which causes the screw shaft 22 to rotate within the housing 20. In some examples, the output shaft of the motor 20 may extend all the way through the anti-extension device 14 and into one side of the torque limiter 16. Another shaft (not shown) extends from the other side of the torque limiter 16 into the gearbox 18. In other examples, the anti-extension device 14 may contain its own shaft (e.g. shaft 56), and the motor output shaft connects to the anti-extension device's shaft 56 (e.g. via splines), and the anti-extension device's shaft 56 may connect to a first side of the torque limiter 16, so that torque from the motor 12 is transmitted to the gearbox.

As the nut 24 is held against rotation relative to the housing 20, rotation of the screw shaft 22 within the housing 20 causes the nut 24 to translate linearly along the axis X, which thus causes the output rod 26 to translate linearly relative to the housing 20. In this manner, rotational output from the motor 22 is converted into a linear output of the EMA 10, by the output rod 26 moving in and out of the housing 20. When used on an aircraft (e.g. aircraft 33 shown in FIG. 9), this linear output of the EMA 10 controls the position of the spoiler 34 relative to the airframe 32.

Figure 2A:
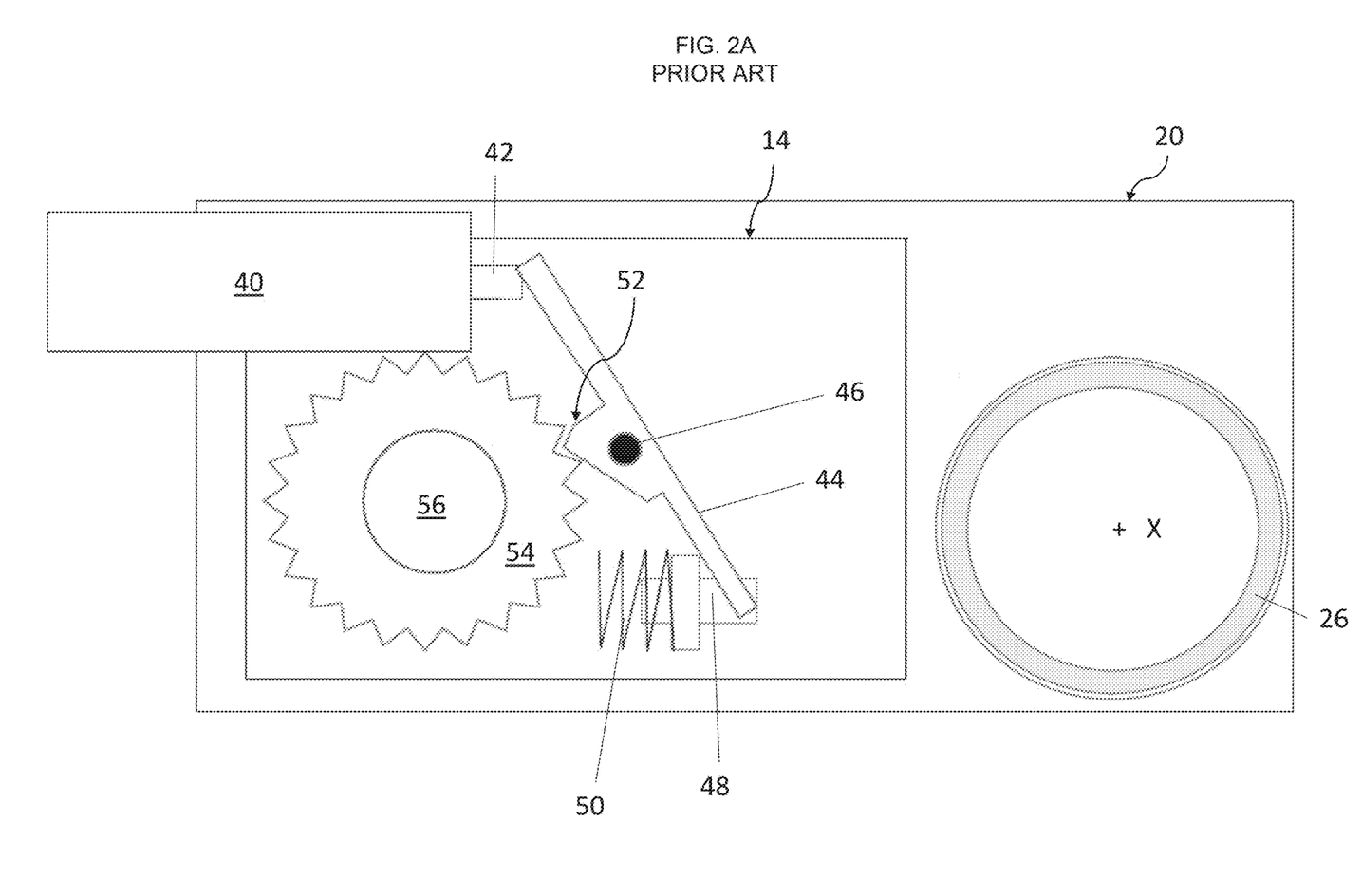
FIG. 2A shows a cross-section of the known EMA in the anti-extension mode.

During flight, there may be significant aerodynamic forces on the spoiler 34. These forces may attempt to pull the output rod 26 further out from the housing 20, or push the output rod 26 into the housing 20. Due to the interaction of the nut 24 with the screw shaft 22, these linear forces on the output rod 26 are converted into torque in the screw shaft 22, which torque is transmitted, via the gearbox 18, into the torque limiter 16 and the anti-extension device 14. The anti-extension device 14 is designed to, when activated, react this torque and thereby prevent rotation of the screw shaft 22 that would allow the output rod 26 to extend further out of the housing 20. This operation is described in more detail below, in relation to FIG. 2.

FIG. 2A shows a cross-section of the known anti-extension device 14. This cross-sectional drawing further shows the housing 20, upon which the anti-extension device 14 is mounted, and also shows the output rod 26 (inside the housing 20) in cross-section.

The anti-extension device 14 comprises a solenoid 40 having a movable output 42 that bears against a first end of a pivotable rod 44. The pivotable rod 44 may be pivoted around a pivot point 46. A second end of the pivotable rod 44 abuts a pusher 48. The pusher 48 is biased by a spring 50. When the solenoid 40 is energized, the movable output 42 moves towards the pivotable rod 44 and pivots the rod 44 from a first position to a second position, said pivoting being about the pivot point 46 and against the bias from the spring 50.

The pivotable rod 44 further comprises a pawl 52 that is arranged adjacent to a ratchet wheel 54. The ratchet wheel 54 is fixedly mounted on a shaft 56. When the anti-extension device 14 is connected to the motor 12, an output shaft of the motor 12 connects to the shaft 56 (or, as above, the shaft 56 may itself be the output shaft of the motor 12), such that torque from the motor 12 turns the shaft 56 and thus turns the ratchet wheel 54 if possible. On the other side of the anti-extension device, the shaft 56 also connects (or extends into) the torque limiter 16.

The pivotable rod 44 is arranged such that, in the first position (i.e. when the solenoid 40 is not energized, shown in FIG. 2A), the pawl 52 abuts the ratchet wheel 54 and, through engagement with teeth of the ratchet wheel 54, prevents rotation of the ratchet wheel in one direction of rotation.

Figure 2B:
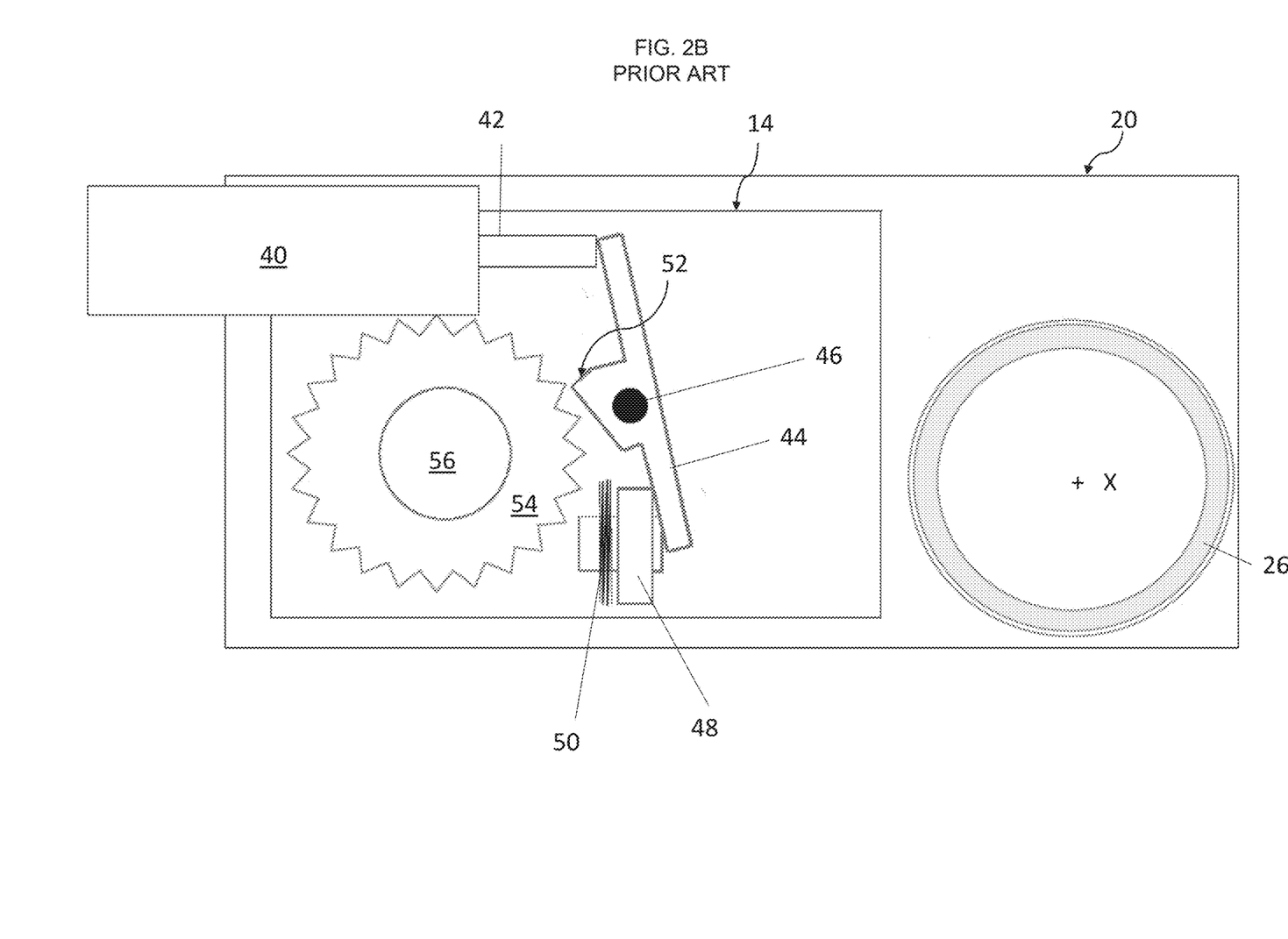
FIG. 2B shows a cross-section of the known EMA in an active mode.

FIG. 2B shows the second position (i.e. when the solenoid is energized), wherein the pivotable rod 44 has been pushed by the movable output 42 to a position where the pawl 52 does not abut the ratchet wheel 54, and the ratchet wheel 54 and shaft 56 may rotate in either direction of rotation. The force from the movable output 42 to pivot the rod 44 also compresses the spring 50. When the solenoid 40 is later de-energised, the force from the spring 50 pushes the pivotable rod 44 back to the first position, whereupon the pawl 52 reengages the ratchet wheel 54.

During operation of the EMA 10, the motor 12 may be used to drive the output rod 26 in extension to a first desired position. The EMA 10 may then engage the anti-extension device by de-energising the solenoid 40. This causes the pawl 52 to engage the ratchet wheel 54 and prevent rotation of the shaft 56 in a first direction of rotation. This first direction corresponds to extension of the output rod 26 out from the housing 20. That is, when aerodynamic forces on the spoiler 34 seek to pull the output rod 26 further out from the housing 20, this linear force is converted, by the interaction of the nut 24 with the screw shaft 22, into a torque on the screw shaft 22. This torque is then transmitted, via the gearbox 18 and torque limiter 16 into the anti-extension device 14. There the torque is reacted by the engagement of the pawl 52 with the ratchet wheel 54. This prevents the torque from being transmitted back into the motor 12 which could damage the motor 12.

If the torque on the shaft 56 in the anti-extension device 14 is too high when the solenoid 40 is energized, the frictional force between the ratchet wheel 54 and pawl 52 may be so great that the solenoid 40 cannot push the pivotable rod 44 so that the pawl 52 disengages from the ratchet wheel 54. Typically during takeoff and landing, an aircraft spoiler may be extended to negative angular positions so that it follows an extended flap of the aircraft wing. This provides a largely continuous surface between a leading edge of the wing and the trailing edge of the flap. In the negative angular positions, the anti-extension mode may be active so that the spoiler cannot move from its negative angular position towards the neutral position/towards a positive position. However, if the pilot retracts the flap at this point, it is possible the flap will load against the extended spoiler, trying to push the extended spoiler back towards the spoiler's neutral/positive position. This force fight between the spoiler in the anti-extension mode and the flap could cause damage to either part. To avoid damage, the torque limiter 16 is provided. This device limits the maximum torque transmitted between the gearbox 18 and the anti-extension device 16. The skilled reader will appreciate that, when the torque limit of the torque limiter 16 is exceeded, the torque limiter will allow rotation on the gearbox 18 side even while the shaft 56 on the side of the anti-extension device 14 is prevented from turning. This thus allows some rotation of the screw shaft 22 and, ultimately, extension of the spoiler 34 towards the neutral position.

SUMMARY

According to a first aspect, there is provided an electromechanical actuator comprising: a motor; a gearbox; an anti-extension device mounted between the motor and the gearbox; wherein the motor and anti-extension device are mounted on a housing of the actuator; a screw shaft; a nut mounted on the screw shaft; an output rod connected to the nut, the output rod having a linear range of motion defined between full extension of the output rod at a first end point and full retraction of the output rod at a second end point; wherein the screw shaft, nut, and output rod are located in a cavity of the housing; wherein the output rod and nut are held against rotation relative to the housing, such that rotation of the screw shaft drives the output rod to move linearly within the housing; wherein the anti-extension device comprises: a ratchet wheel mounted on a shaft arranged to be driven by the motor; a pivotable rod comprising a pawl; the pivotable rod being pivotable between a first position in which the pawl engages with the ratchet wheel to prevent rotation of the ratchet wheel in one direction of rotation, and a second position in which the pawl does not prevent rotation of the ratchet wheel; a cam connected to the pivotable rod, the cam movable between a first cam position and a second cam position, wherein the cam is biased by a spring towards the first cam position in which a portion of the cam extends through an aperture in the housing and into the cavity; wherein in the second cam position, the cam holds the pivotable rod at the second position in which the pawl does not prevent rotation of the ratchet wheel; wherein, when an axial end of the output rod is at a predetermined intermediate point or between the intermediate point and the second end point, the cam is moved to the second cam position by an outer surface of the output rod bearing against the cam; and wherein when the axial end of the output rod is between the intermediate point and the first end point, the output rod does not bear against the cam.

In this manner, whenever the output rod is sufficiently retracted into the housing, the anti-extension device is automatically disabled such that the pawl does not engage with the ratchet wheel.

The housing may comprise a housing connection end for connecting the actuator to an airframe; and the output rod may comprise an output rod connection end for connecting the actuator to a spoiler.

The cam may have a curved or chamfered end; and/or the end of the output rod may be curved or chamfered.

This may allow the cam to be moved smoothly into the anti-extension device when the output rod presses the cam thereinto.

The anti-extension device may be directly connected to the gearbox. That is, the actuator may lack a torque limiter between the anti-extension device and the gearbox, for example.

The anti-extension device may further comprise a solenoid having a movable output; wherein, when the axial end of the output rod is between the intermediate point and the first end point, movement of the movable output moves the pivotable rod to the second position.

That is, when the output rod is not pressing the cam into the anti-extension device, the solenoid may be used to control the position of the pivotable rod and pawl relative to the ratchet wheel.

In such examples, when an axial end of the output rod is at the predetermined intermediate point or between the intermediate point and the second end point, movement of the movable output does not affect the position of the pivotable rod.

The electromechanical actuator may optionally not comprise a torque limiter at any location along a load path between the motor and the screw shaft. The existence of the cam and its interaction with the output rod and the anti-extension device may eliminate the need for any torque limiter, such as is often provided on prior art actuators.

According to a second aspect, there is provided an aircraft comprising an airframe and a flight surface, and the electromechanical actuator as described hereinabove. In this aspect, the housing of the electromechanical actuator is connected to the airframe and the output rod of the electromechanical actuator is connected to the flight surface, such that the position of the output rod relative to the housing controls an angular position of the flight surface relative to the airframe.

The actuator may be arranged such that when the end of the output rod is at a second intermediate axial point, the flight surface is at an angle of zero degrees relative to the airframe.

The second intermediate axial point may be coincident with the predetermined intermediate point, such that the output rod bears against the cam only when the spoiler at an angle of greater than zero degrees relative to the airframe.

The second intermediate point may be at a different axial location from the predetermined intermediate point. Optionally, the second intermediate point may be located axially between the predetermined intermediate point and the second end point.

The flight surface may be is a spoiler.

BRIEF DESCRIPTION OF THE FIGURES

Certain embodiments will now be described in greater detail by way of example only and with reference to the accompanying drawings in which.

DETAILED DESCRIPTION

A new design of EMA 100 will now be described in relation to FIGS. 3 to 8. The new design of EMA 100 shares several similarities with the known EMA 10 design described hereinabove, and where like components are used, the same reference numeral will be used.

Figure 3:
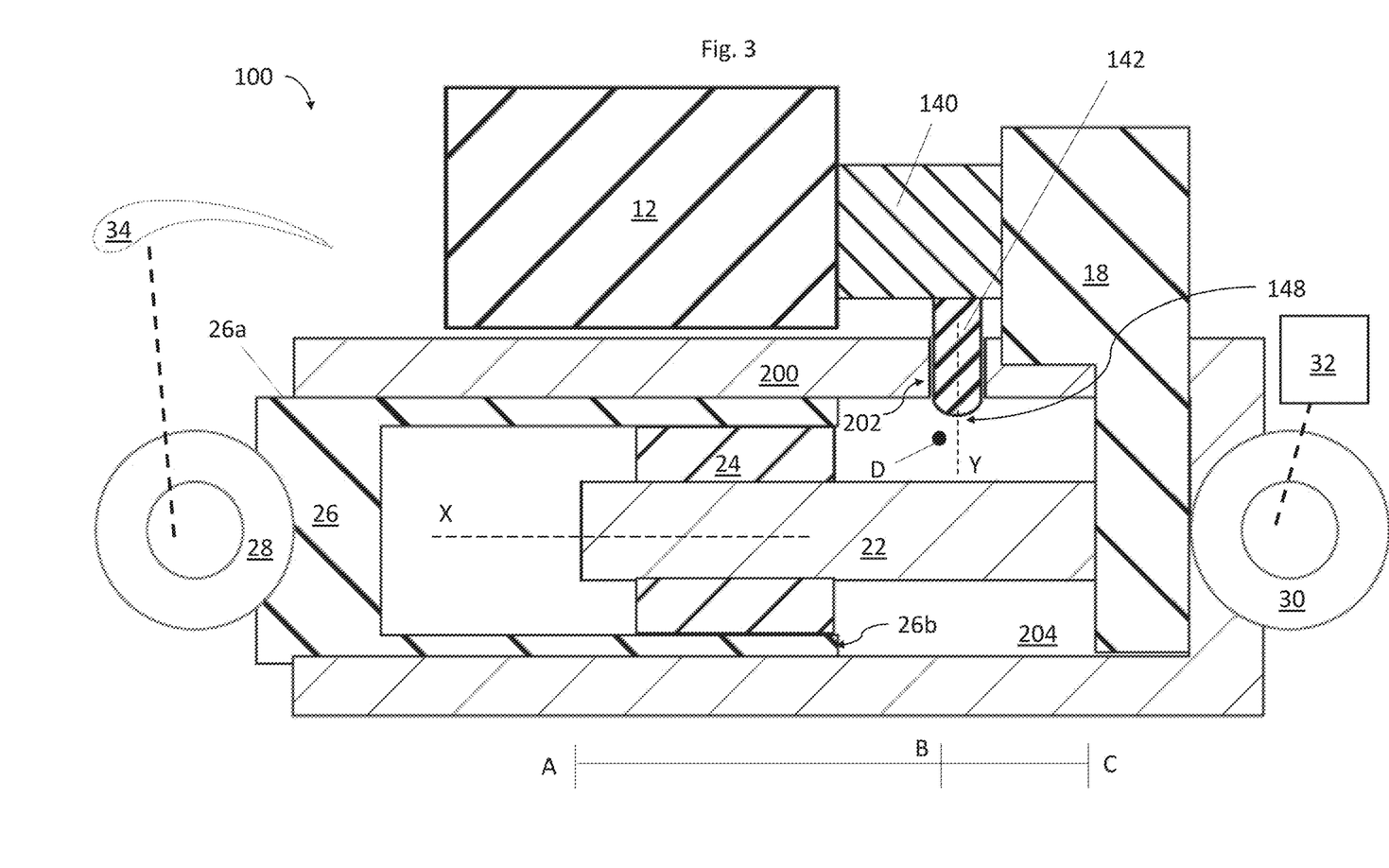
FIG. 3 shows a cross-section of a new design of EMA for a spoiler, the new EMA having a new design of anti-extension device.

The EMA 100 shown in FIG. 3 comprises a motor 12 and a new design of anti-extension device 140 having a cam 142. The anti-extension device 140 connects directly between the motor 12 and a gearbox 18. That is, compares to the known EMA 10 described above, there is no torque-limiter 16 present in the new design of EMA 100. Removal of the torque limiter may reduce the overall weight of the new design of EMA 100 compared to the known EMA 10 described above.

The motor 12, anti-extension device 140, and gearbox 18 are mounted to a housing 200. In one example, the housing 200 may be identical to the housing 20 of FIG. 1 except that the housing 200 comprises an aperture 202 through which the cam 142 extends. Thus, a housing 20 from the known design of EMA 10 may be simply converted into the new design of housing 200 simply by drilling a hole through the housing 20, to form the aperture 202 that receives the cam 142. The aperture 202 allows the cam 142 to extend from the anti-extension device 140, through the housing 200, and into a cavity 204 inside the housing, in which the output rod 26 moves.

As described in greater detail below, the cam 142 is movable along a second axis Y between a first cam position (shown in FIG. 4) and a second cam position (shown in FIG. 6). The second axis Y is non-parallel with the first axis X and may be generally perpendicular to the first axis X.

The output rod 26 has a connection end 28 for connection to a spoiler 34 and the housing 200 has a housing connection end 30 where the housing (and EMA 100 as a whole) may be connected to the airframe 32. When the cam 142 is pressed in to the anti-extension device 140, the anti-extension functionality of the anti-extension device 140 is automatically disabled, i.e. the anti-extension device 140 does not prevent extension of the output rod 26 while the anti-extension device is disabled, regardless of whether the solenoid 40 is energized or not, in the manner discussed in greater detail below.

As before, the gearbox 18 transmits torque from the motor 12 to turn the screw shaft 22. The nut 24 is mounted on the screw shaft 22 and the nut connects to the output rod 26 which, like before, is held against rotation relative to the housing 200.

During normal operation, when the motor 12 of FIG. 3 is activated, torque is transmitted through the anti-extension device 140 and gearbox 18, to turn the screw shaft 22. Rotation of the screw shaft causes the nut 24, and therefore the output rod 26, to move linearly relative to the housing 200. As such, rotational output from the motor 12 is, as before, converted into linear movement of the output rod 26 and this linear movement of the output rod 26 sets the position of the spoiler 34 relative to the airframe 32.

Figure 4:
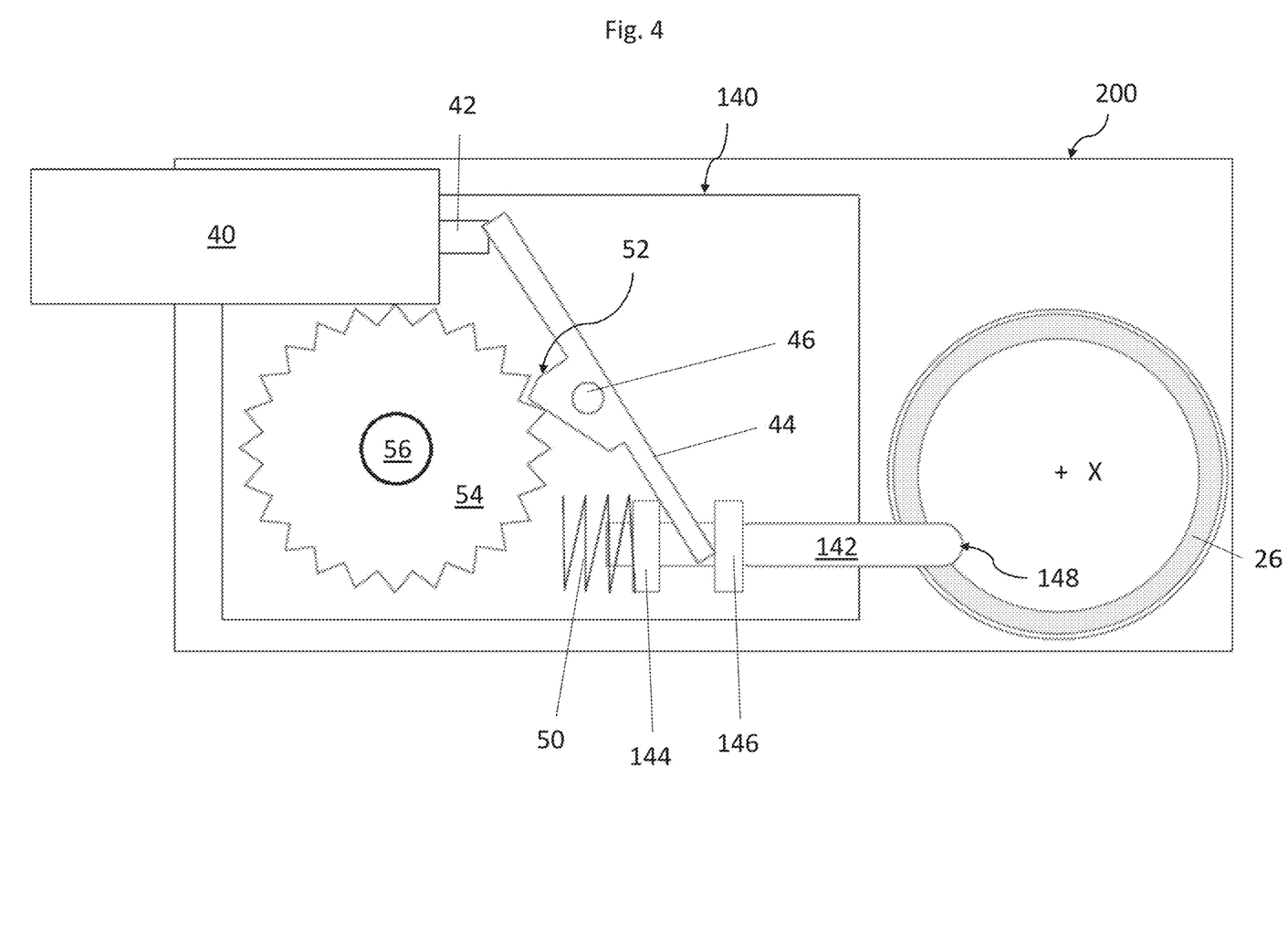
FIG. 4 shows a cross-section of the new anti-extension device.

FIG. 4 shows a cross-sectional view of the new design of anti-extension device 140. The new anti-extension device 14 shares a number of similar components to the anti-extension device 14 described above in relation to FIG. 2, and where like components are used, the same reference numeral will be used.

The anti-extension device 140 comprises the solenoid 40 having the movable output 42 that bears against the first end of a pivotable rod 44. The pivotable rod 44 may be pivoted around the pivot point 46.

While the cam 142 is not pushed into the anti-extension device 140 by the output rod 26, the anti-extension device is not disabled. When the anti-extension device is not disabled, the position of the pawl 52 with respect to the ratchet wheel 54 is under the control of the solenoid 40. That is, when the solenoid 40 is energized, the movable output moves towards the pivotable rod 44 and pivots the rod, from a first rod position to a second rod position, said pivoting being about the pivot point 46 and against the bias from the spring 50. When the solenoid is de-energized, the bias from the spring 50 pivots the pivotable rod back to its initial first rod position. As such, while the cam 142 is not being pushed into the anti-extension device 140 by the output rod 26, the solenoid 40 controls whether the anti-extension device acts to prevent extension of the output rod 26 or not.

A second end of the pivotable rod 44 abuts the cam 142. The cam 142 comprises a first flange 144 and a second flange 146. The spring 50 biases the cam 142 outward from the anti-extension device 140 (and therefore, biases the cam 142 generally in towards the axis X, into the cavity 204 of the housing 200)—this position is the first cam position of the cam 142. The second end of the pivotable rod 44 is located between the first and second flanges 144,146 of the cam 142, such that movement of the cam 142 in either direction along the second axis Y controls the angular position of the pivotable rod 44 about the pivot point 46. That is, when the cam 142 moves in to the anti-extension device 140, to its second cam position, this movement causes the second flange 146 to bear against the second end of the pivotable rod 44 and pivot the rod 44 such that the pawl 52 disengages the ratchet wheel 54. Movement of the cam 142 further out from the anti-extension device 140, under bias from the spring 50, causes the first flange 144 to bear against the pivotable rod 44 and pivot the rod 44 so as to bring the pawl 52 back into engagement with the ratchet wheel 54. The cam 142 may only move out from the anti-extension device 140, under bias from the spring 50, at times when the output rod 26 is not pressing the cam 142 into the anti-extension device 140.

At times when the output rod 26 is not pressing the cam 142 into the anti-extension device, the pivotable rod 44 may be moved by the solenoid 40 such that the pawl 52 is disengaged from the ratchet wheel 54. When the solenoid 40 moves the pivotable rod 44 to such a disengaged rod position, the second end of the pivotable rod 44 presses against the first flange 144 and, against the bias of the spring 50, pulls the cam 142 into the anti-extension device 140.

The output rod 26 is linearly movable relative to the housing 200 along a range of motion depicted by the line A-C in FIG. 3. Point A corresponds to full extension of the output rod 26, i.e. out from the housing 200, and point C corresponds to full retraction of the output rod 26. More precisely, point A may correspond to a first axial position of an end 26b of the output rod 26 within the housing 200, and point C may correspond to a second axial position of the end 26b of the output rod 26 within the housing 200.

Figure 7:
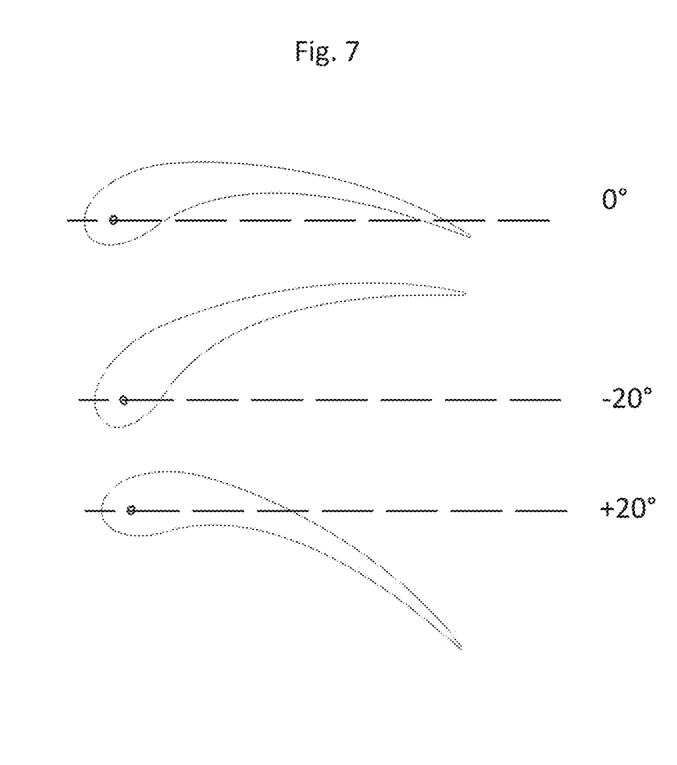
FIG. 7 shows positions of the spoiler controlled by the EMA.

When connected to an airframe 32 and spoiler 34, the linear position of the output rod 26 relative to the housing 200 sets the angle of the spoiler 34 relative to the airframe 32. Various angles of the spoiler 34 are shown in FIG. 7. The EMA 100 may be arranged such that a given axial position B of the output rod 26 within the housing 200 corresponds to a 0° position of the spoiler 34. The position B may be located between the ends A and C of the range of motion available to the output rod 26. That is, the EMA 100 may be arranged to allow the spoiler 34 to be moved within a range of positive angles, a range of negative angles, and to be held at a 0° position. For example, the spoiler 34 may be movable between +15° and −50°, where +15° of the spoiler 34 corresponds to the output rod 26 being at full retraction at position C, and where −50° of the spoiler 34 corresponds to the output rod 26 being at full extension at position A.

When the spoiler 34 is at positive angular positions, i.e. its angular position is >0°, the spoiler 24 is said to be operating in the "droop area". The droop area of the spoiler 34 thus corresponds to the output rod 26 being in the linear range of <B and ≥C relative to the housing 200.

Figure 8:
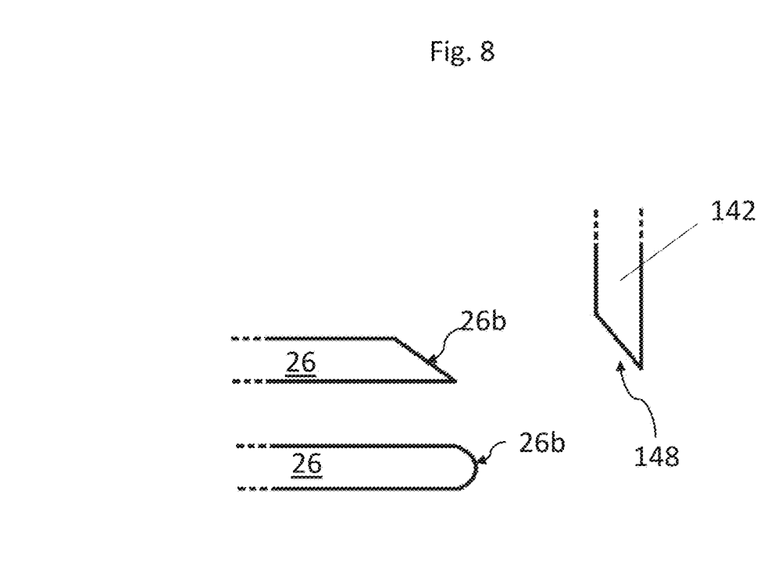
FIG. 8 shows various end profiles of a cam and of an output rod of the new EMA.

In the position depicted in FIG. 3, the output rod 26 is at a linear position within the cavity 204 where the output rod 26 does not abut against the cam 142. When the output rod 26 retracts within the cavity 204, it will eventually come into contact with an angled end 148 of the cam 142. The angled end 148 may be a curved end, e.g. hemispherical, or may be e.g. chamfered (as shown in FIG. 8).

The angled end 148 allows the cam 142 to ride up onto a radially outer surface 26a of the output rod 26 when, during retraction of the output rod 26, an end 26b of the output rod 26 first comes into alignment with the cam 142. The end 26b of the output rod 26 may also be chamfered or curved (as shown in FIG. 8) to allow a smooth motion of pushing the cam 142 out from the cavity 204. With brief reference to FIG. 5, this Figure depicts a cross-section of the EMA 100 where the output rod 26 is retracted sufficiently far into the housing 200 that the cam 142 is pressed away from the first axis X and into the anti-extension device 140.

Figure 5:
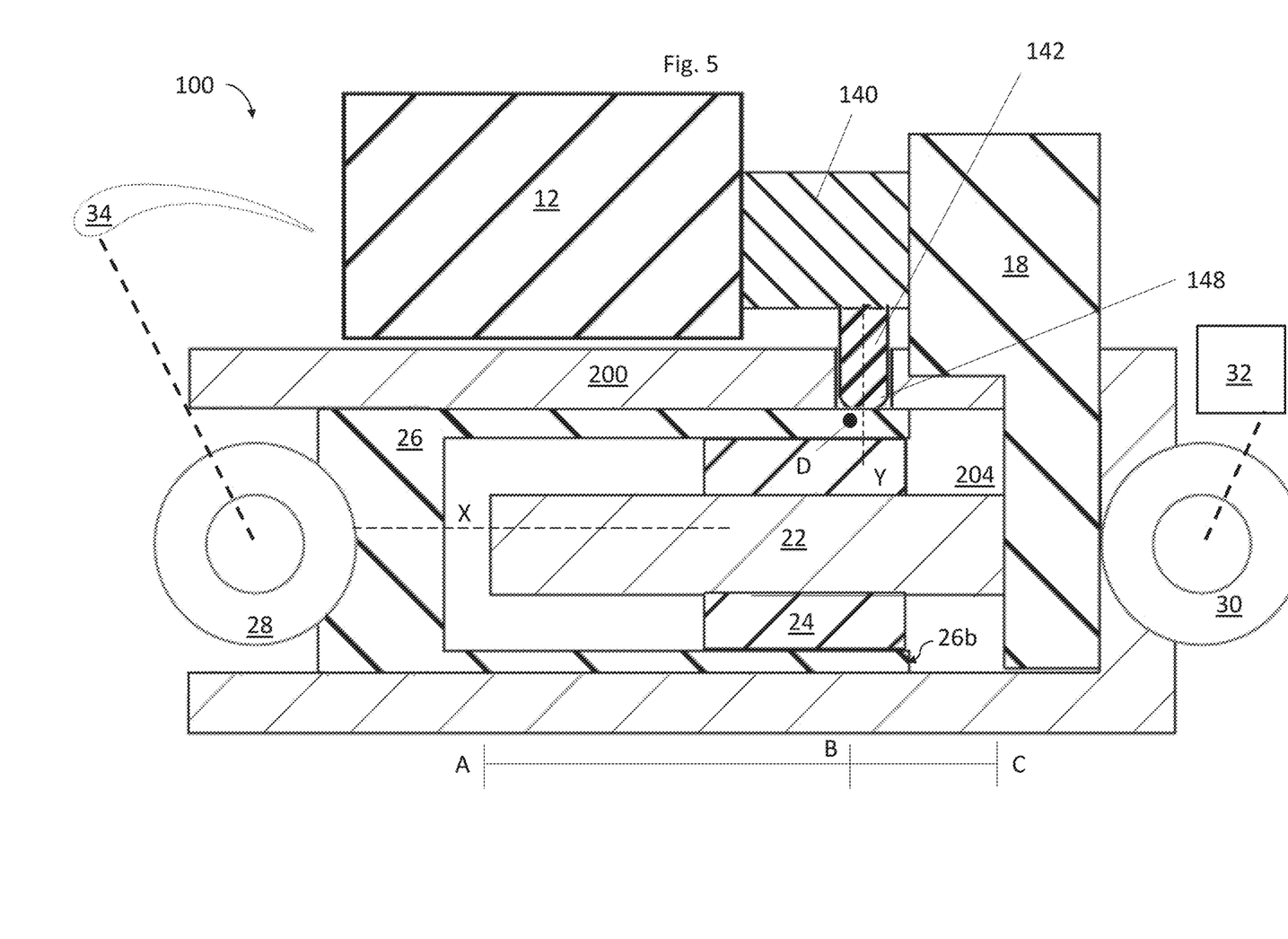
FIG. 5 shows a second cross-section of the new EMA.

An intermediate axial position D of the output rod 26, between the end points A and C, is defined as the point where the end 26b of the output rod 26 first bears against the angled end 148 of the cam 142 and has pushed the cam 142 into the anti-extension device 140 sufficiently far so as to cause the pawl 52 to disengage from ratchet wheel 54. When the output rod 26 is pressing the cam 142 into the anti-extension device 140, the anti-extension device 140 is disabled. That is, in this cam position, regardless of whether the solenoid 40 is energized or not, the pawl 52 does not contact the ratchet wheel 54 and thus the shaft 56 is free to rotate in either direction.

Intermediate axial position D (where the end 26b of the output rod 26 first meets the cam 142) may be identical to position B (where the spoiler is at) 0°, but this is not essential. When axial positions D and B are identical, i.e. at the same axial location along axis X, this means that the anti-extension device 140 is disabled whenever the spoiler 34 is at 0° or higher. In this example, when the spoiler 34 is at angles <0°, the anti-extension device 140 is no longer disabled and the engagement/disengagement of the pawl 52 from the ratchet wheel 54 is again under the control of the solenoid 40.

In other embodiments, intermediate axial position D is offset from position B. For example, the intermediate axial position D may be set at a spoiler angle of +10°. In this example, the anti-extension device 140 will be disabled whenever the spoiler 34 is at a 10° angle or higher.

Figure 6:
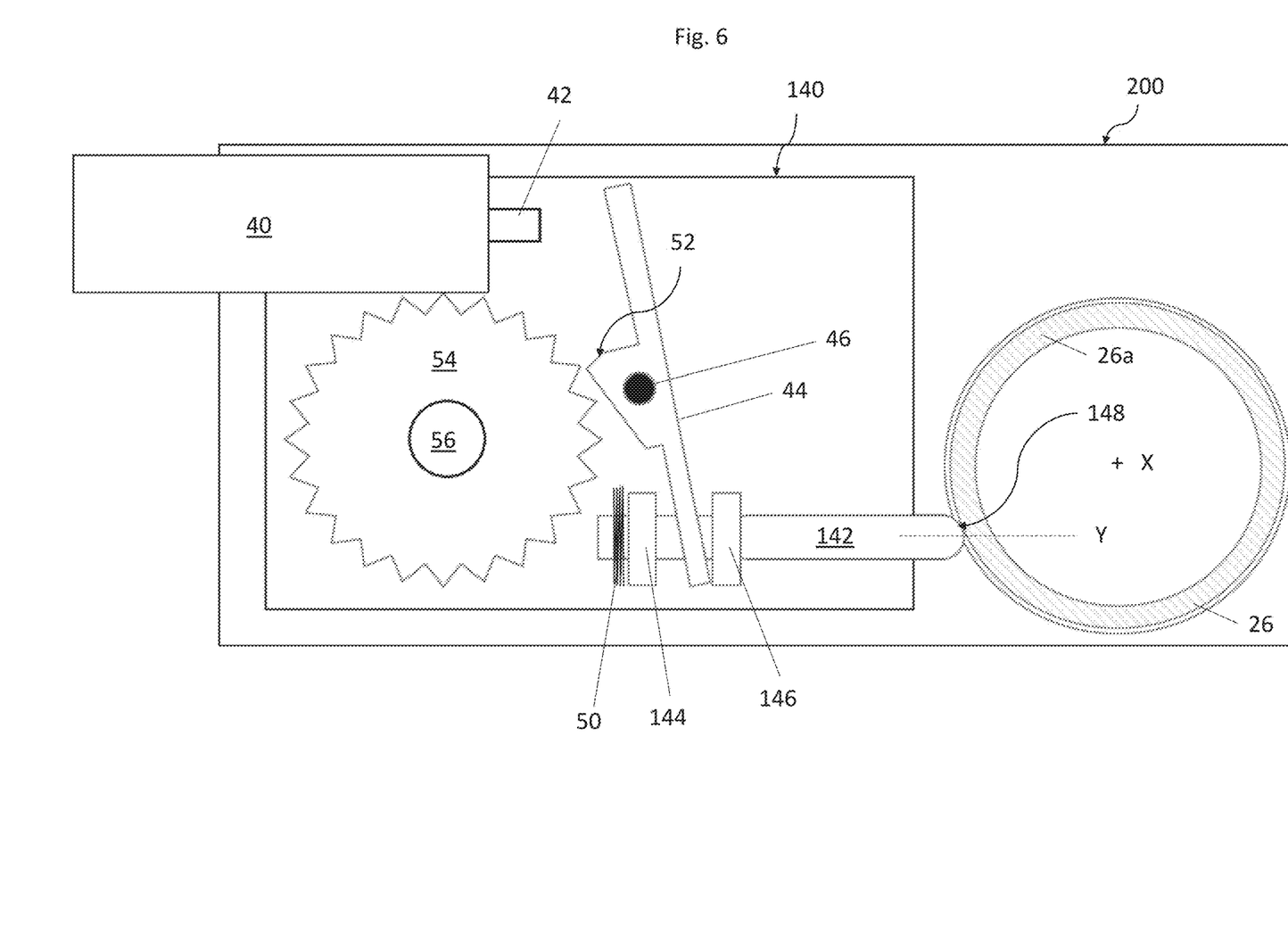
FIG. 6 shows a second cross-section of the new anti-extension device.

FIG. 6 shows the cross-section of the anti-extension device 140 when the output rod 26 is at the rod position shown in FIG. 5, i.e. where the output rod 26 has pushed the cam 142 in to the anti-extension device 140. Here, the first flange 144 has compressed the spring and the second flange 146 has pushed the second end of the pivotable rod 44 to the second rod position wherein the pawl 52 does not engage the ratchet wheel 54. As may be seen, the movable output 42 of the solenoid 40 is still in its original position (i.e. the solenoid 40 is not energized) and the movable output 42 is not presently in abutment with the pivotable rod 44. Thus, when the output rod 26 has pushed the cam 142 into anti-extension device 140, the pawl 52 is disengaged from the ratchet wheel 52 regardless of whether or not the solenoid 40 is energized. That is, the anti-extension device 140 is automatically disabled whenever the output rod 26 is pressing the cam 142 into the anti-extension device 140.

When the output rod 26 extends beyond position D, the cam 142 is biased back into the cavity 204 by the force of the spring 50. At this point, the anti-extension device 140 is again under control of the solenoid 40. That is, if the solenoid 40 is now energized, the movable output 42 will push the pivotable rod 44 to the second position, where the pawl 52 is disengaged from the ratchet wheel 54.

The skilled reader will appreciate that, when the (end 26b of the) output rod 26 is anywhere within the linear range between points A and D, the solenoid 40 determines whether the anti-extension device 140 is engaged or not. When the (end 26b) of the output rod 26 is anywhere within the linear range between positions D and C, the anti-extension device 140 is automatically disabled, by virtue of the cam 142 being pushed into the anti-extension device 140 and thereby disengaging the pawl 52 from the ratchet wheel 54.

FIG. 8 depicts various alternative shapes for the angled end 148 of the cam 142 and for the end 26b of the output rod 26. FIG. 8 shows: a chamfered end of the output rod 26; a rounded end of the output rod 26; and a chamfered end of the cam 142. The EMA 100 may use any combination of the various end shapes depicted in any of the Figures for the cam 142 and for the output rod 26.

Figure 9:
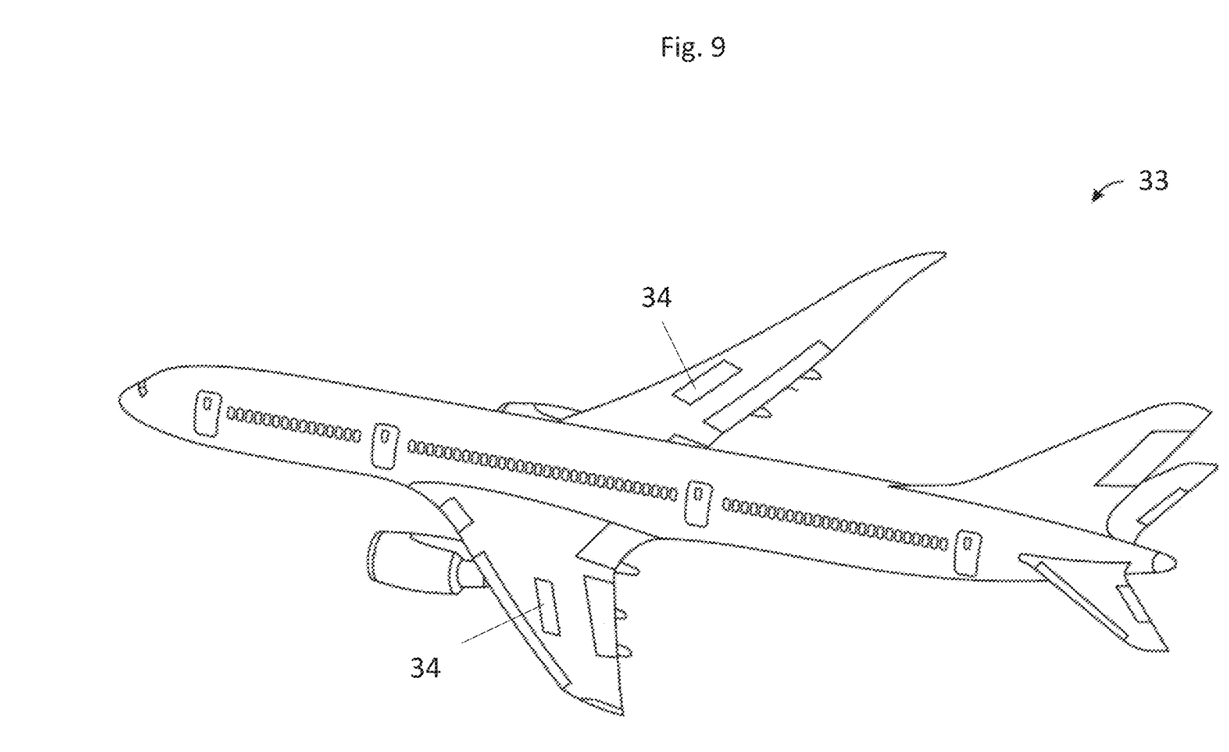
FIG. 9 shows an aircraft.

FIG. 9 shows an aircraft 33 having the spoiler 34. The aircraft 33 comprises the airframe 32 and the EMA may be connected to any suitable part of the airframe, such as inside of the wing or on the underside of the wing, near the spoiler 34.

While the foregoing discussion has discussed control of a spoiler 34, the electromechanical actuator 100 may be used to control different control surfaces of an aircraft, including flaps, slats, ailerons etc.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An electromechanical actuator comprising:
   a housing of the actuator;
   a motor;
   a gearbox;
   an anti-extension device mounted between the motor and the gearbox, wherein the motor and anti-extension device are mounted on the housing of the actuator;
   a screw shaft;
   a nut mounted on the screw shaft; and
   an output rod connected to the nut, the output rod having a linear range of motion defined between full extension of the output rod at a first end point (A) and full retraction of the output rod at a second end point (C);
   wherein the screw shaft, nut, and output rod are located in a cavity of the housing;
   wherein the output rod and nut are held against rotation relative to the housing, such that rotation of the screw shaft drives the output rod to move linearly within the housing;
   wherein the anti-extension device comprises:
      a ratchet wheel mounted on a shaft arranged to be driven by the motor;
      a pivotable rod comprising a pawl; the pivotable rod being pivotable between a first rod position in which the pawl engages with the ratchet wheel to prevent rotation of the ratchet wheel in one direction of rotation, and a second rod position in which the pawl does not prevent rotation of the ratchet wheel; and
      a cam connected to the pivotable rod, the cam movable between a first cam position and a second cam position, wherein the cam is biased by a spring towards the first cam position in which a portion of the cam extends through an aperture in the housing and into the cavity; wherein, in the second cam position, the cam holds the pivotable rod at the second rod position in which the pawl does not prevent rotation of the ratchet wheel;
      wherein, when an axial end of the output rod is at a predetermined intermediate point (D) or between the intermediate point (D) and the second end point (C), the cam is moved to the second cam position by an outer surface of the output rod bearing against the cam; and
      wherein when the axial end of the output rod is between the intermediate point (D) and the first end point (A), the output rod does not bear against the cam.

2. The electromechanical actuator of claim 1, wherein the housing comprises a housing connection end for connecting the actuator to an airframe; and wherein the output rod comprises an output rod connection end for connecting the actuator to a spoiler.

3. The electromechanical actuator of claim 1, wherein the cam has a curved or chamfered end; or wherein the end of the output rod is curved or chamfered.

4. The electromechanical actuator of claim 1, wherein the anti-extension device is directly connected to the gearbox.

5. The electromechanical actuator of claim 1, wherein the anti-extension device further comprises a solenoid having a movable output;
   wherein, when the axial end of the output rod is between the intermediate point (D) and the first end point (A), movement of the movable output moves the pivotable rod to the second rod position.

6. The electromechanical actuator of claim 5, wherein when an axial end of the output rod is at the predetermined intermediate point (D) or between the intermediate point (D) and the second end point (C), movement of the movable output does not affect the position of the pivotable rod.

7. The electromechanical actuator of claim 1, wherein the electromechanical actuator does not comprise a torque limiter at any location along a load path between the motor and the screw shaft.

8. An aircraft comprising:
   an airframe;
   a flight surface; and
   an electromechanical actuator as recited in claim 1;
   wherein the housing of the electromechanical actuator is connected to the airframe and the output rod of the electromechanical actuator is connected to the flight surface, such that the position of the output rod relative to the housing controls an angular position of the flight surface relative to the airframe.

9. The aircraft of claim 8, wherein the actuator is arranged such that when the end of the output rod is at a second intermediate axial point (B), the flight surface is at an angle of zero degrees relative to the airframe.

10. The aircraft of claim 9, wherein the second intermediate axial point (B) is coincident with the predetermined intermediate point (D), such that the output rod bears against the cam only when the spoiler at an angle of greater than zero degrees relative to the airframe.

11. The aircraft of claim 9, wherein the second intermediate point (B) is at a different axial location from the predetermined intermediate point (D).

12. The aircraft of claim 11, wherein the flight surface is a spoiler.

13. The aircraft of claim 11, wherein the second intermediate point is located axially between the predetermined intermediate point (D) and the second end point (C).

* * * * *